United States Patent Office 3,767,587
Patented Oct. 23, 1973

---

3,767,587
STABLE AQUEOUS DISPERSIONS OF OPTICAL BRIGHTENING AGENTS
Uwe Claussen, Gunther Boehmke, and Wulf von Bonin, Leverkusen, Germany, assignors to Bayer Aktiengesellschaft, Leverkusen, Germany
No Drawing. Filed Apr. 1, 1971, Ser. No. 130,489
Claims priority, application Germany, Apr. 7, 1970,
P 20 16 470.9
Int. Cl. D06l *3/12*
U.S. Cl. 252—301.2 W                5 Claims

ABSTRACT OF THE DISCLOSURE

Process for the production of stable aqueous dispersions of sparingly water-soluble optical brightening agents, characterised in that association complexes of these brightening agents and low-molecular complex formers are introduced into aqueous solutions of polymeric compounds, which may contain surface-active agents, wherein such optical brighteners are preferably used, whose association complexes with 1,3-dinitrobenzene exhibit in a dioxan solution containing the brightening agent in a $10^{-3}$-molar and 1,3-dinitrobenzene in a 2.7-molar concentration at 20° C. and a layer thickness of 1 cm. a $\Delta\Delta m$-value of between $5 \cdot 10^{-3}$ and $600 \cdot 10^{-3}$.

---

The present invention relates to stable aqueous dispersions of sparingly water-soluble optical brightening agents and to the production and use thereof.

It is generally known to prepare dispersions of this kind by comminuting the brightening agent in a first step in a comparatively expensive way by means of suitable grinding devices, such as sand or bead mills, to an optimum granular size of 0.3 to $0.5\mu$, and to stabilise the resultant system in a second step by the addition of dispersing agents which surround the particles of the brightening agents (cf. Ullman, Enzyklopädie der techn. Chemie, Edition B, volume 1, p. 718).

However, the bead or sand mills to be used for comminuting the active substance have a number of disadvantages. For example, the material to be ground must frequently be prepared by a preliminary operation because the active substance, water dispersing agent and possibly a tenside have to be mixed. Furthermore, a certain viscosity must not be exceeded. This constitutes a limitation of the concentration of the active substance and thus of the space/time yield. After removal from the mill, the ground material must be separated from the grinding media. If the tenside or dispersing agent has not been added from the start, a second mixing operation then follows, and this is succeeded by the further process steps, e.g. spray drying and others.

It has now been found that stable aqueous dispersions of sparingly water-soluble optical brightening agents are obtained in a simple way by introducing association complexes of these brightening agents and water-soluble low-molecular complex formers into aqueous solutions of polymeric compounds which may contain surface-active agents.

Association complexes of optical brightening agents have not yet been described in the literature. Consequently, it was not obvious to use them for the preparation of aqueous dispersions of brightening agents.

The term "complexes" as used in the present case means electron donor-acceptor complexes which are frequently designated in the literature as charge-transfer complexes and are described, for example, by Briegleb in "Elektronen-Donator-Acceptor-Komplexe" (Springer Verlag Berlin 1961, pp. 1–7). A characteristic feature of such complexes is the so-called charge-transfer band (CT-band) in the absorption spectrum. The procedure for measuring the CT-band consists in measuring the increase of the extinction in the visible or ultra-violet range of the spectrum as compared with the extinction of the donator (D) and acceptor (A), i.e. in determining the extinction module which is suitable for comparing different complexes of the same kind. The following measuring parameters are fixed for establishing the module:

[Do] = $10^{-3}$ molar = donor (brightening agent) concentration
[Ao] = 2.7 molar = acceptor concentration Dioxan is used as solvent; 1,3-dinitrobenzene serves as acceptor.

As measuring data there are read, at a layer thickness $t[=1 \text{ cm.}]$ and a measuring temperature of 20° C., the extinction differences $\Delta E$ in the absorption flanks at 450 and $550\mu$:

$$\Delta E_{450-500}^{total} = E_{450}^{total} - E_{500}^{total}$$

Since the complex AD absorbs longer waves than the components A and D, the change of extinction depends on the formation of the complex AD and is defined as follows:

$$\Delta\Delta E_{450-500}^{AD} = \Delta E_{450-500}^{total} - \Delta E_{450-500}^{A}$$

$$- \Delta E_{450-500}^{D} \Delta\Delta E_{450-500}^{AD} = \Delta\Delta m_{450-500}^{AD}$$

To simplify the notation, the indices are left out in the following and $$\Delta\Delta m_{450-500}^{AD}$$

is replaced with $\Delta\Delta m$.

The complex is sufficiently defined by stating the value $\Delta\Delta m$: a high value indicates a high affinity.

According to the invention there are used those optical brightening agents whose solubility in water preferably is below 5 g. per litre and whose association complex with 1,3-dinitrobenzene has $\Delta\Delta m$ value of between $5 \cdot 10^{-3}$ and $600 \cdot 10^{-3}$ under the standard conditions described above. They comprise, in particular: 1,3-diaryl-pyrazolines such as are described e.g. in Austrain patent specification No. 260,924; French patent specification No. 1,453,061; German patent specification No. 1,080,963; British patent specification No. 883,826; and Swiss patent specification No. 415,535, more particularly

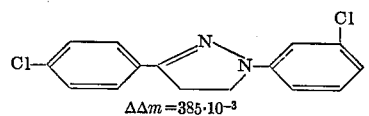

$\Delta\Delta m = 385 \cdot 10^{-3}$

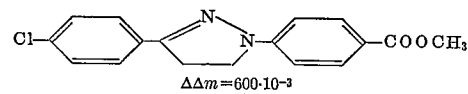

$\Delta\Delta m = 600 \cdot 10^{-3}$

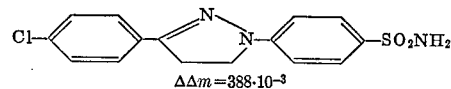

$\Delta\Delta m = 388 \cdot 10^{-3}$

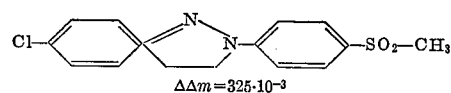

$\Delta\Delta m = 325 \cdot 10^{-3}$

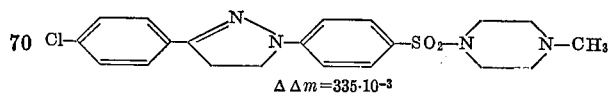

$\Delta\Delta m = 335 \cdot 10^{-3}$

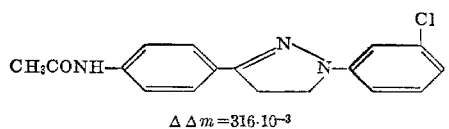

$\Delta \Delta m = 316 \cdot 10^{-3}$ 3-aryl or 3-heteryl-carbostyriles such as are described e.g. in British patent specifications Nos. 1,087,375 and 1,103,531, more particularly

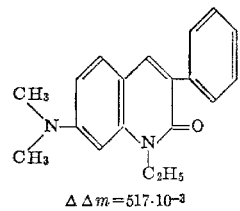

$\Delta \Delta m = 517 \cdot 10^{-3}$

Styrylbenzoxazoles, as e.g. described in the French patent specification No. 1,397,629, specifically

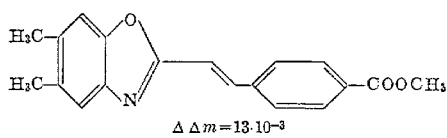

$\Delta \Delta m = 13 \cdot 10^{-3}$ 3-aryl- or 3-heteryl-coumarins, e.g.

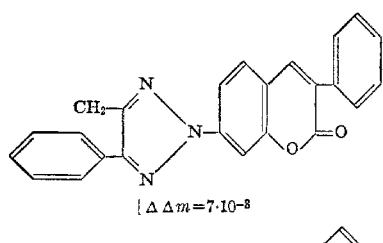

$\Delta \Delta m = 7 \cdot 10^{-3}$ $\Delta \Delta m = 13 \cdot 10^{-3}$

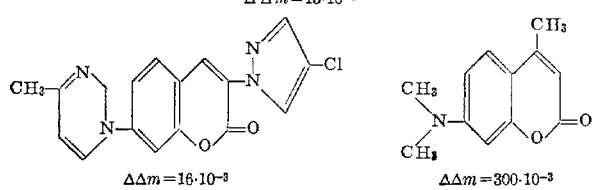

$\Delta \Delta m = 16 \cdot 10^{-3}$ $\Delta \Delta m = 300 \cdot 10^{-3}$ furthermore, sparingly water-soluble optical brightening agents which contain a pyrene nucleus, such as are described e.g. in Belgian patent specification No. 625,678 and British patent specification No. 1,141,454, more particularly

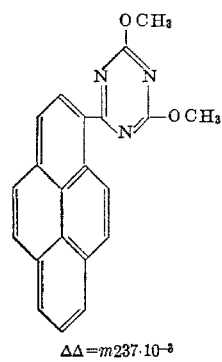

$\Delta \Delta = m237 \cdot 10^{-3}$ tetrahydrothionaphthenes, more particularly

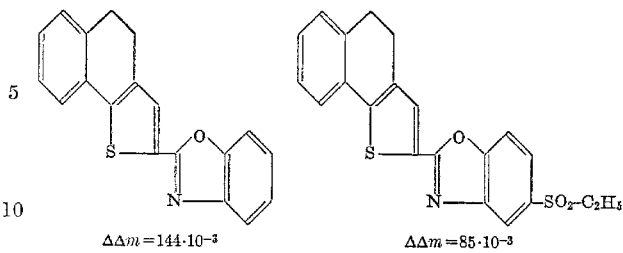

$\Delta \Delta m = 144 \cdot 10^{-3}$ $\Delta \Delta m = 85 \cdot 10^{-3}$ bis-benzoxazolyl-thiophenes according to German patent specifications Nos. 1,166,197 and 1,226,583, e.g.

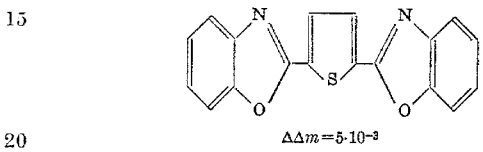

$\Delta \Delta m = 5 \cdot 10^{-3}$ bis-benzimidazolyl-ethylenes according to German patent specifications Nos. 883,286 and 841,752, e.g.

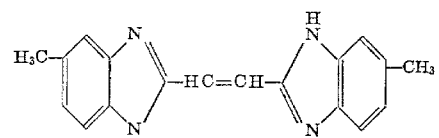

$\Delta \Delta m = 74 \cdot 10^{-3}$ bis-benzoxazolyl-stilbenes according to U.S. patent specifications Nos. 3,260,715 and 3,322,680, e.g.

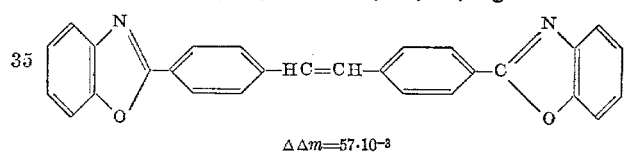

$\Delta \Delta m = 57 \cdot 10^{-3}$ as well as bis-triazinyl-stilbenes according to Swiss patent specification No. 472.416, e.g.

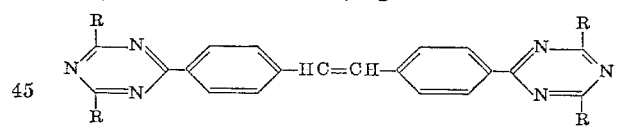

Suitable low-molecular complex formers are water-soluble colourless compounds which have little odour and are physiologically unobjectionable, preferably those containing amide groupings, such as open-chain and cyclic carboxylic acid amides and imides as well as ureas, but also sulphoxides and unsaturated, preferably polybasic carboxylic acids.

Suitable amides are, for example, methyl formamide, dimethyl formamide, diethyl formamide, dimethyl acetamide, pyrrolidone, piperidone, N,N-dimethyl thioacetamide, acrylamide.

Suitable imides are e.g. maleinimide, N-methyl maleinimide, N-ethyl maleinimide, N-propyl maleinimide, N-butyl maleinimide, N-(β-hydroxyethyl)-maleinimide, succinimide, phthalimide, N-methyl phthalimide, N-butyl phthalimide, N-(β-hydroxyethyl)-phthalimide.

Suitable ureas are, for example, urea, methylurea, N,N-dimethyl-urea, N,N'-dimethyl-urea, ethylene-urea.

Suitable sulphoxides are, for example, dimethyl sulphoxide and diethyl sulphoxide.

Suitable unsaturated carboxylic acids are, for example, maleic acid, phthalic acid, tetrachloro-phthalic acid, 4,5-dimethyl-phthalic acid, acrylic acid.

Water-soluble polymers which can be used according to the invention are primarily the following types:

(1) vinyl polymers
(2) graft polymers of vinyl compounds on to polyethers and/or polyacetals (3) homo- and copolymers of maleic acid and its derivatives.

Suitable vinyl polymers are homo- and copolymers of vinyl-pyrrolidone, vinyl-piperidone, vinyl alcohol, vinyl acetamide, vinyl formamide, N-methyl-acrylamide, acrylamide, methacryloyl-taurine, hydroxyethyl or hydroxypropyl (meth)-acrylate. Water-soluble polyvinyl esters, i.e. those containing carboxyl groups, are also suitable.

Polyvinyl-pyrrolidone and polyhydroxyethyl acrylate are particularly preferred.

Suitable graft polymers are those of vinyl acetate and/or vinyl pyrrolidone on to polyethers of ethylene oxide and/or propylene oxide or polyacetals from di- and/or triethylene glycol and formaldehyde, provided these compounds are water-soluble.

The preparation of such graft polymers is known and is described, for example, in German "Auslegeschriften" (published specifications) Nos. 1,111,394; 1,077,430 and 1,161,423.

Suitable polymers derived from maleic acid are homo- and copolymers of maleic acid itself or its anhydride, its esters and amides, but especially of its semiesters and/or semiamides and cyclic amides (imides), provided they contain a sufficient number of water-solubilizing groups.

The semiesters are prepared in known manner by reacting the corresponding maleic anhydride polymers with alcohols in the presence or absence of a solvent or dispersing agent. As alcohols, there are preferably used those mono-hydroxyl compounds which either contain not more than 6 carbon atoms such as methanol, ethanol or cyclohexanol, or which are water-soluble addition products of at least 2 mol ethylene oxide on to a starting compound containing hydroxyl groups, such as p-phenyl-phenol or oleyl alcohol, isononyl-phenol, phenol, butanol, etc.; examples are addition products of about 13 mol ethylene oxide on to p-phenyl-phenol or of about 10 mol ethylene oxide on to isononyl-phenol. The polymeric semiesters can also be produced in a simplified way by first preparing the corresponding maleic acid semiesters and subsequently subjecting these to a homo- or copolymerisation with, for example, styrene, vinyl acetate, or vinyl ethers. These alcohols may be used in stoichiometrically deficient amounts or, preferably, in excess in which case they can act as solvent, if desired.

The semiamides are preferably prepared in known manner by reacting the maleic anhydride polymer with primary or secondary amines, possibly with mixtures of amines such as ammonia, methylamine, diethanolamine, cyclohexylamine or benzylamine; cyclohexylamine and diethanolamine are preferred.

Obviously, it is also possible to prepare and to use mixed semiester-semiamide polymers by using an alcohol as well as an amine.

Suitable homo- and copolymers of maleinimide are, for example, those described in German "Offenlegungsschrift" (published specification) No. 1,595,704 and Belgian patent specification No. 745,157.

In this group there are preferably used copolymers of maleic anhydride and styrene which have been reacted with addition products of ethylene oxide on to phenyl-phenol or nonyl-phenol and cyclohexylamine and are water-soluble, either directly or in the form of their ammonium salts.

The molecular weights of the polymers should expediently lie above 10,000, preferably between 15,000 and 200,000.

The quantitative proportion between optical brightening agent and water-soluble polymer may be between 10:1 and 1:10, preferably between 5:1 and 2:1.

As surface-active substances which may be added to improve dissolving, to reduce the viscosity of highly concentrated mixtures, for spontaneous dispersion and for increasing the brightening rate, there may be used non-ionic and ionic tensides such as anion-active, cation-active or amphoteric tensides. A compilation of usable ionic tensides can be found in Schwartz-Perry-Berch: "Surface Active Agents and Detergents" (Vol. 2, Interscience Publishers Inc., New York, 1958). The anion-active tensides may be:

alkyl-sulphonates as described loc. cit. p. 61-71;
alkylaryl-sulphonates as described loc. cit. p. 78-100;
fatty acid amidoalkane-sulphonates as described loc. cit. p. 76;
alkyl-sulphuric acid ester salts as described loc. cit. p. 40-61;
alkyl- and alkylphenol ether sulphonates as described in German Pat. No. 605,973;
amophoteric compounds, e.g. alkyl-aminoalkyl-sulphonates as described in DAS (German published specification) No. 1,020,144;
alkyl-benzimidazole-sulphonates as described in DAS (German published specification) No. 1,257,779;
cation-active products are mentioned loc. cit on pages 112-118.

It is also possible to use condensed aryl-sulphonic acids, such as e.g. di-naphthalene-methane-sulphonic acids; condensation products from naphthol-sulphonic acid, cresol, formaldehyde and sodium bisulphite (Fiat Final Report No. 1013), diphenyl ether sulphonic acid and formaldehyde (U.S. Pat. No. 2,315,951), hydroxydiphenyl-sulphonic acid and formaldehyde, urea and phenol, such as diphenol-sulphonic acid and formaldehyde [DAS (German published specifications) Nos. 1,113,457; 1,178,081].

The amounts of these ionic tensides are established for the individual association products by preliminary experiments, but they will preferably amount to below 10%, referred to the amount of brightening agent. The amounts used are thus far lower than those of conventional dispersing agents.

The procedure for preparing the association complexes to be used according to the invention generally consists in combining approximately equimolar amounts of the brightening agent and the low-molecular complex former, and thoroughly mxing them by mechanical means. If the complex former has a solid consistency at room temperature, it is recommended to melt the components together and subsequently to comminute the solidified melt. If the association product is not stable to hydrolysis, it is possible to evaporate the solvent and to use the residue. The brightening agents can also be stirred in an inert slightly polar solvent, e.g. benzines, lower chlorinated hydrocarbons and others, with the associating substances, and the solvent removed after formation of the association product, e.g. by filtration or centrifuging.

However, it is particularly advantageous to carry out the formation of the association complex with the crude, possibly still moist brightening agent as it is isolated, for example, from the filter press at the end of the production process. This permits of dispensing with other expensive operations such as drying and comminuting operations. The complex formation can be recognised from a change of colour towards red, green, yellow-green or yellow shades and, in the case of association products with one liquid component, by a hardening of the initially tacky and viscous mass. The reaction time lies between a few seconds and 24 hours and strongly depends on the reaction conditions and the chemical structure of the components.

With the aid of the stable dispersions which can be obtained according to the new process it is possible to achieve on synthetic fibre materials outstanding brightening effects whose degree of whiteness is higher than that obtainable with conventional mixtures. In particular, these dispersions permit of a faultless level penetration of wound packages, cones etc. in brilliant white shades. Very good brightening effects can also be attained on paper. Furthermore, there is achieved a very rapid dispersion in the slurry of detergents and improved brightening from wash liquors.

The new process for the production of dispersions of brightening agents may be illustrated in greater detail with the aid of the following examples:

EXAMPLE 1

50 g. of an association product of dimethyl formamide and 3-(p-chlorophenyl) - 1-(p-sulphamidophenyl)-pyrazoline-2 in a molar ratio of 1:1 and 13.1 g. of a conventional polyvinylpyrrolidone are triturated in a mortar with 45 ml. of water containing 2 ml. of a 7.5% aqueous oleyl-benzyl-aminoethane-sulphonic acid. The thinly liquid, finely divided dispersion becomes viscous after standing for some time. This thixotropy can be prevented by replacing the water with a solution of 10 g. urea in 35 ml. of water. The content of active substance amounts to 35.2% and can be adjusted os desired by diluting with water.

The average particle size amounts to $1.1\mu$. Dyeings carried out with this preparation wield a brilliant bluish white effect on polyacrylonitrile or polyamide fibres. Wound packages such as cones can also be faultlessly dyed through in a brilliant white shade.

When the product is incorporated in a detergent, there is achieved at 40° C. and in a reaction time of 10 minutes at a concentration of 50 mg./litre, a degre of whiteness, according to the degree of whiteness formula of Berger, of 116, compared with 111 as is obtained with a conventional dispersion of the optical brightening agent.

The association product used above is obtained in the following way: 67 g. 3-(p-chlorophenyl)-1-(p-sulphamidophenyl)-pyrazoline-2 (industrial product) and 14.6 g. dimethyl formamide are combined to form a tacky mass. When this is shaken over night, it solidifies to give green-yellow hard lumps which are pulverised. The association product melts at 190° C. but resolidifies immediately to melt again at 228° C.

EXAMPLE 2

5 g. 1-(dimethoxy-triazinyl)-pyrene in the form of a 1:1 complex with dimethyl foramide are triturated in a mortar with 5 g. of a 50% aqueous solution of a graft polymer obtained from equal parts of vinyl acetate and polyethylene glycol 1550 and 6 g. of a 50% aqueous urea solution. A thinly liquid dispersion of very good dyeing properties is obtained; the degree of whiteness attainable on polyester fibres is higher than that of conventional formulations.

EXAMPLE 3

Instead of the 3-(p-chlorophenyl) - 1-(p-sulphamidophenyl)-1-pyrazoline-2 mentioned in Example 1, there is used 3 - (4-chloropyrazolyl) - 7 - (3-methyl-pyrazolyl)-coumarin, 3-phenyl-7-[2(4-phenyl - 5 - methyl)-1,2,3-triazolyl]-coumarin or 4 - methyl - 7-diethylamino-coumarin, dispersions of similarly good tbrightening effect being obtained.

EXAMPLE 4

24 g. 3-(p-chlorophenyl) - 1-(p-sulphamido)-pyrazoline-(2)·dimethyl formamide are triturated in a mortar with 20 g. of a 15% aqueous solution of polyacrylamide and 5 ml. of a 50% aqueous urea solution. The dispersion contains particles of an average diameter of $1.5\mu$. When a dispersion of 34 percent by weight of an optical brightening agent which is not present in the form of a complex and 8.2 percent by weight of the same polymer is treated in an analogous way, it yields an average particle diameter of only $3.1\mu$.

The same effect is achieved when polyvinyl acetamide is used, instead of polyacrylamide.

EXAMPLE 5

24 g. 3-(p-chlorophenyl)-1-(p-sulphamidophenyl)-pyrazoline-2·dimethyl formamide are triturated in a mortar with 20 g. of a 16% aqueous solution of polyacrylic acid glycol ester and 5 g. of water. In this way there are obtained dispersions with an average particle diameter of $1.0\mu$, with which outstanding whitening effects can be achieved, for example, on polyacrylonitrile. The polyacrylic acid glycol ester may be replaced with a copolymer from acrylic acid and hydroxypropyl acrylate, a copolymer from equal parts of acrylic acid, acrylamide and hydroxypropyl methacrylate, or a polymer prepared according to the following instruction:

100 parts of an equimolar copolymer of vinyl acetate and maleic anhydride are hydrolysed in 200 parts of water at 80° C., a clear solution of the acid form of the polymer being formed.

EXAMPLE 6

24 g. 3-(p-chlorophenyl)-1-(p-sulphamidophenyl)-pyrazoline-2·dimethyl formamide are intimately mixed with 20 g. of a 50 percent by weight aqueous solution of a polyethylene oxide graft polymer and 20 ml. of a 50 percent by weight aqueous urea solution. The average particle diameter amounts to $0.6\mu$, compared with $2.9\mu$ in the case where a non-associated optical brightening agent is used.

To prepare the graft polymer, a mixture of 100 parts of polyethylene oxide [molecular weight approx. 1500] and of a mixture of 67 parts vinyl acetate and 33 parts N-vinylpyrrolidone in which 1 part azo-diisobutyro-nitrile has been dissolved, is stirred under $N_2$ at 75° C. for 20 hours. 200 parts of water are subsequently added and there is obtained a clear aqueous 50% solution of the resultant graft polymer.

Polymers which can be obtained according to the above instruction and in which (a) the vinyl acetate/N-vinyl-pyrrolidone mixture is replaced with 100 parts vinyl acetate or
(b) with a mixture of 50 parts each of vinyl acetate and N-vinyl-pyrrolidone can be used with the same effect.

When 100 parts polyethylene oxide are replaced in the above instruction with a diethylene glycol-formaldehyde-polyacetal with a molecular weight of approx. 1300, then the average particle diameter amounts to $1.1\mu$ with the use of the association product, and to $3.4\mu$ with the use of the non-associated brightening agent. A polymer in which 100 parts polyethylene oxide are replaced with 50 parts of a diethylene glycol-formaldehyde-polyacetal with a molecular weight of approx. 1300 gives the same results. Graft polymers of 50 parts N-vinyl-pyrrolidone on to 100 parts polyethylene oxide 1550 or of equal parts of N-vinyl-pyrrolidone and polyethylene oxide 1550 can also be used.

EXAMPLE 7

24 g. 3-(p-chlorophenyl)-1-(p-sulphamidophenyl)-pyrazoline-2·dimethyl formamide are triturated in a mortar with 20 g. of a 30 percent by weight aqueous solution of a reaction product of 1 part of an equimolar styrene-maleic anhydride copolymer and 1 part 3-dimethylamino-1-amino-propane, and with 10 ml. of a 50% aqueous urea solution. The average particle diameter of the dispersion amounts to $0.4\mu$.

The 3-dimethylamino-1-aminopropane can be replaced with comparable effect in the above instruction with diethanolamine or with polymers obtained according to the following instructions:

(a) 300 parts of an equimolar copolymer of maleic acid cyclohexyl semiester and styrene with a molecular weight of approx. 30,000 are dissolved at 80° C. in 500 parts of an addition product of about 10 mol ethylene oxide on to 1 mol isononylphenol, and the solution is stirred for several hours. 55 parts of a concentrated aqueous ammonia solution and 750 parts of water are then added, and there is obtained an approx. 50% readily pourable solution which can immediately be used. The average particle diameter of a dispersion with 44.5% of optical brightening agent as dimethyl formamide addition product and 37% of the solution of the polymer amounts to $1.7\mu$.

(b) Into an autoclave there is introduced a mixture consisting of 400 parts of an equimolar copolymer of styrene and maleic anhydride, molecular weight approx. 32,000, 220 parts diethanolamine, 600 parts of an addition product of about 14 mol ethylene oxide on to 1 mol p-phenyl-phenol, 2800 parts of water. The mixture is then heated at 160° C. for 10 hours, and after cooling there is obtained a clear solution which can be immediately used; dry content approximately 30%.

(c) As above, but the water is replaced with a 10% aqueous ammonia solution, that is to say that an aqueous solution of the semiamide ammonium salt is formed.

EXAMPLE 8

24 g. 3-(p-chlorophenyl)-1-(p-sulphamidophenyl)-pyrazoline-2·dimethyl formamide are ground for ½ hour with 20 g. of a 15% aqueous solution of a maleic acid polymer and with 10 ml. of a 50 percent by weight aqueous urea solution. The average particle size in the dispersion amounts to $1.1\mu$, whereas it amounts to $2.5\mu$ when the brightening agent was used in non-associated form. Under the same conditions the 1:1 complex of 3-(p-chlorophenyl)-1-(p-methoxycarbonyl-phenyl)-pyrazoline-2 and dimethylsulphoxide yields a similar good result.

The polymer can be prepared as follows:

Into an autoclave there are introduced 3300 parts of water, 80 parts NaOH, 346 parts sulphanilic acid and 400 parts of an equimolar maleic anhydride-styrene copolymer with a molecular weight of approx. 80,000. The mixture is heated under $N_2$ at 170° C. for 10 hours, and there is obtained a clear solution of the resultant imide which tends to gel upon cooling. This solution of the Na-salt is most expediently diluted to a solids content of 15% and then used.

The polymers obtained in the following way can be used with comparable effect:

(a) Into an autoclave there are introduced 800 parts of an equimolar styrene/maleic anhydride copolymer with a molecular weight of approx. 30,000, 2800 parts of water, 400 parts N-dimethyl-propylene-diamine-1,3, 240 parts acetic acid. The mixture is then heated at 170° C. for 10 hours, and after cooling there is obtained a clear solution of the basic imide in the form of the acetate.

(b) Into an autoclave there are introduced 800 parts of an equimolar styrene-maleic anhydride copolymer, 800 parts of a concentrated aqueous ammonia solution and 2400 parts of water. The mixture is heated at 170° C. for 10 hours and there is obtained a slightly turbid solution of the resultant cyclic imide which is precipitated by acidification. The resultant solution is diluted to a dry content of 10 percent by weight for more convenient handling.

(c) As above, but this time there are used only 200 parts of the primary-tertiary diamine, and 200 parts cyclohexylamine are added instead. The amount of acetic acid is reduced to 170 parts. The resultant imide likewise forms a solution; it tends to gel and is therefore expediently diluted to a dry content of 25%.

EXAMPLE 9

The following low-molecular complex formers can be used, instead of the dimethyl formamide mentioned in Example 1: monomethyl formamide, dimethyl acetamide, phthalimide, N-butylphthalimide and tetrachlorophthalic acid.

For example, in a dispersion with a content of 15 percent by weight of the graft polymer of 1 part N-vinyl-pyrrolidone and 2 parts vinyl acetate on to polyethylene glycol 1550, and of 37 percent by weight of brightening agent active substance the average particle diameter achieved with the association product with dimethyl acetamide amounts to $1.0\mu$, with monomethyl formamide to $1.5\mu$, with dimethyl formamide to $0.6\mu$, compared with $2.8\mu$ in the case of the non-associated brightening agent.

The degree of whiteness of the brightening effects and the properties of the dispersion correspond to the data given in Example 1.

EXAMPLE 10

Instead of the oleyl-benzyl-aminoethane-sulphonic acid, the following compounds may be used in Example 1 as tensides or dispersing agents in the presence of polyacrylic acid glycol ester which takes the place of the polyvinyl-pyrrolidone mentioned in Example 1: bis-(hydroxydiphenyl-ether)-methane-sulphonic acid, bis-(hydroxy-trimethylene)-urea, diisobutylnaphthalene sulphonate. The degree of whiteness and the properties of the dispersion correspond to the data given in Example 1.

EXAMPLE 11

Instead of oleyl-benzyl-aminoethane-sulphonic acid, the following compounds may be used in Example 1 as tensides or dispersing agents in the presence of the reaction product of an equimolar maleic anhydride-styrene copolymer and sulphanilic acid, which takes the place of the polyvinyl-pyrrolidone mentioned in Example 1: glycerol-1,3-bis-(2-ethylhexyl-ether)-2, sulphuric acid ester, stearyl-benzyl-aminopropane-sulphonic acid, oleyl alcohol polyglycol ether (16 mol ethylene oxide), saccharose-polypropyl ethyl ether (10 mol polypropylene, 8 mol ethylene oxide). The degree of whiteness and the properties of the dispersion correspond to the data given in Example 1.

EXAMPLE 12

Instead of oleyl-benzyl-aminoethane-sulphonic acid, the following compounds may be used in Example 1 as tensides or dispersing agents in the presence of a graft polymer of 1 part N-vinyl-pyrrolidone and 2 parts vinyl acetate on to 3 parts polyethylene oxide 1350, which takes the place of the polyvinyl-pyrrolidone mentioned in Example 1: bis-diphenylether methane-sulphonate, saccharose-polypropyl ethyl ether (10 mol propylene oxide, 8 mol ethylene oxide), dodecyl-benzyl-dimethyl ammonium chloride, glycerol-1,3-bis-(2-ethylhexyl-ether)-2, sulphuric acid ester, sulphation products of the compound mentioned in German patent specification No. 740,104, Example 4.

We claim:

1. A stable aqueous dispersion of a sparingly water-soluble optical brightening agent which comprises a mixture of (1) an aqueous solution of a polymeric compound selected from the group consisting of a vinyl polymer, a graft polymer of a vinyl compound onto a polyether or a polyacetal, a maleic acid polymer, a maleic anhydride polymer, a maleic acid ester polymer, a maleic acid amide polymer, and a maleic acid imide polymer, and (2) an association complex of said brightening agent and a low-molecular complex former in a quantitative proportion of brightening agent: polymeric compound of 10:1 to 1:10; said brightening agent being further defined as having a water solubility below 5 g./liter and exhibiting a $\Delta\Delta\text{-}m$ value of between $5\times10^{-3}$ and $600\times10^{-3}$ when measured at 20° C. and a layer thickness of 1 cm. on an association complex comprising $1\times10^{-3}$ molar concentration of said brightening agent and 2.7 molar concentration of 1,3-dinitrobenzene; said low-molecular complex former being selected from the group consisting of carboxylic acid amides, carboxylic acid imides, ureas, sulfonides, and unsaturated carboxylic acids.

2. The dispersion of claim 1 which additionally contains a surface active agent.

3. The dispersion of claim 1 wherein said brightening agent is selceted from the group consiting of diaryl pyrazolines, 3-arylcarbostyriles, 3-heterylcarbostyriles, 3-arylcoumarins, 3-heterylcoumarins, triazinylpyrenes, bisbenzoimidazolylethylenes, bis-benzoxazolylthiophenes, bis-benzoxazolylstilbenes, styrylbenzoxazoles, and bistriazinylstilbenes.

4. The dispersion of claim 1 wherein said low-molecular complex former is selected from the group consisting of methylformamide, dimethyl formamide, diethyl formamide, dimethyl acetamide, pyrrolidone, piperidone, N,N-dimethyl thioacetamide, acrylamide, maleimide, N-methyl maleimide, N-ethyl maleimide, N-propyl maleimide, N-butyl maleimide, N-($\beta$-hydroxyethyl)-maleimide, succinimide, phthalimide, N-methyl phthalimide, N-butyl phthalimide, N-($\beta$-hydroxyethyl)-phthalimide, urea, methylurea, N,N-dimethylurea, N,N'-dimethylurea, ethyleneurea, dimethyl maleic acid, phthalic acid, tetrachlorophthalic acid, 4,5-dimethylphthalic acid, and acrylic acid.

5. The dispersion of claim 1 wherein said polymeric compound is selected from the group consisting of homopolymers and copolymers of vinylpyrrolidone, vinylpiperidone, vinly alcohol, vinyl acetamide, vinyl formamide, N-methylacrylamide, acrylamide, methacryloyltaurine, hydroxyethyl methacrylate, hydroxypropyl methacrylate, hydroxyethyl acrylate, maleic acid, maleic anhydride, maleic acid ester, maleic acid amide, maleic acid imide, maleic acid semiester, or maleic acid semiamide and graft polymers of vinyl acetate or vinyl pyrrolidone onto polyethers of ethylene oxide or propylene oxide or onto polyacetals from diethylene triethylene glycol and formaldehyde.

References Cited

UNITED STATES PATENTS

| | | | |
|---|---|---|---|
| 3,214,455 | 10/1965 | McKusick et al. | 260—429 R |
| 3,406,118 | 10/1968 | Tscharner et al. | 252—301.2 W |
| 3,496,112 | 2/1970 | Goldwasser et al. | 252—301.2 W |
| 3,546,217 | 12/1970 | Siegrist et al. | 252—301.2 W |
| 3,573,956 | 4/1971 | Hausermann et al. | 252—301.2 W |

OTHER REFERENCES

Foster: Organic Charge-Transfer Complexes, Academic Press, New York, N.Y., 1969, pp. 2, 3, 82–89, 230–235.

DANIEL E. WYMAN, Primary Examiner

A. P. DEMERS, Assistant Examiner

U.S. Cl. X.R.

117—33.5 T; 260—29.2 UA, 29.2 N, 29.2 R